Nov. 4, 1952   G. HANSEN   2,616,729
JOINT WITH TELESCOPING ANNULAR MEMBER
Filed Feb. 26, 1948

Inventor:
George Hansen,
By Joseph O. Lange
Atty.

Patented Nov. 4, 1952

2,616,729

UNITED STATES PATENT OFFICE 2,616,729

JOINT WITH TELESCOPING ANNULAR MEMBER

George Hansen, Chicago, Ill., assignor to Crane Co., Chicago, Ill., a corporation of Illinois Application February 26, 1948, Serial No. 11,067

4 Claims. (Cl. 285—22)

This invention relates to a joint for pipe or tubing made by means of annular telescopic members. More particularly it is concerned with a novel pipe joint useful for effecting a joint with relatively flexible tubing such as rubber or the like and having means in combination with the joint whereby if desired the latter may be protected within a more substantial arrangement such as a cylinder, tubing or metal pipe.

Another important object is to provide for a joint in which the outer or armored form of tubing is usable as such without need for any special machining thereof.

Another important object is to provide for a novel form of pipe connection between the protected tubing such as rubber or the like whereby fluid pressure within such tubing assists in effecting a tight joint.

Figure 1:
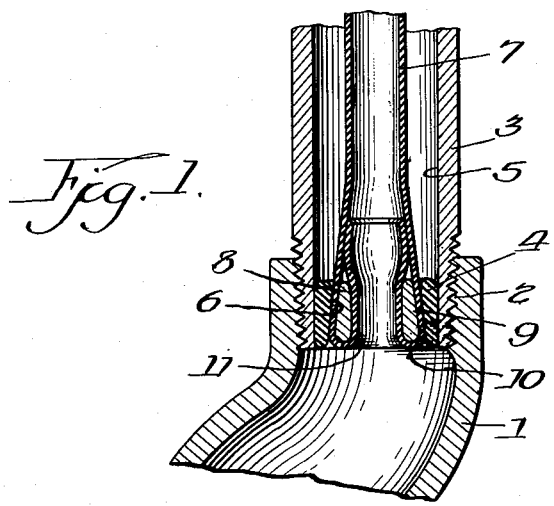

Other important objects and advantages will become more readily apparent upon proceeding with the following specification read in light of the accompanying drawings in which Fig. 1 is a fragmentary sectional view showing one form of an embodiment of my invention.

Figure 2:
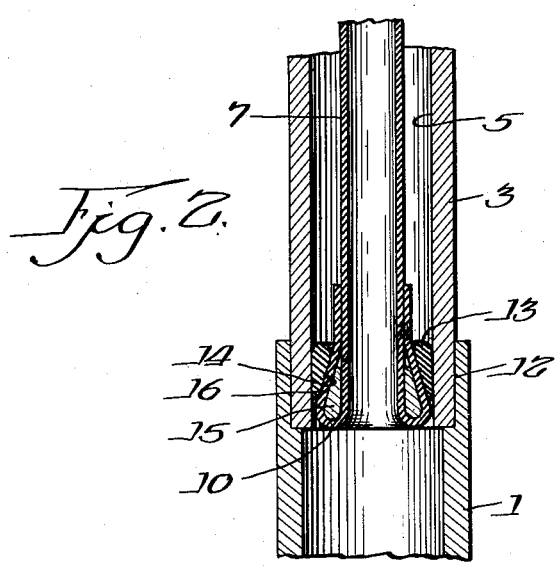

Fig. 2 is a fragmentary sectional view of another embodiment.

Similar reference characters refer to similar parts throughout the several views.

Referring now to Fig. 1, there is shown as at 1 a fitting or other pressure vessel having the threaded pipe connection as at 2 for receiving the pipe 3, and the detailed manner in which the latter connection is made is not significant. As will hereinafter be pointed out it is with the interior of the pipe or tubing 3 with which the invention hereinafter set forth is more concerned. The outer member or ferrule 4 is made of a resilient or distortable material and is made of such dimensions as to fit relatively snugly within the inside diameter 5 of the tubing 3. It is made inwardly tapering as shown at 6, the rubber tubing 7 in its initial assembly being pulled through the rubber ferrule 4. On the inside surface of the tubing 7 and in telescopic relation with the outer ferrule, is the inner annular member or ferrule 8 having an outwardly tapered surface 9 in wedging relation with the surface 6 and having the end of the tubing 7 interposed therebetween. The inner member 8 is preferably provided with the inside diameter as indicated at 11 to receive the remaining inturned end portion of the tubing 7. The inner ferrule 8 may be of brass or of some other suitable non-corrodible metal and it will be apparent that in assembly of the tubing 7 upon the inner ferrule 8 the latter member is simply inverted inside the rubber tubing by placing the brass ferrule on a tapered plug and forcing and stretching the rubber hose or tubing over the brass ferrule 9. The rubber ferrule is placed over the rubber hose and since the latter has preferably the same taper as the brass ferrule an annular wedging action will take place between the brass ferrule, the hose 7 and the rubber ferrule 4 as illustrated. Thus it has been found that by reason of the tubular contact at 5 between the surface of the rubber tubing 7 and the tapered surface of the rubber ferrule 4 a strong substantial seal and connection is made not only between the tubing 7 and the tapered surface 6 of the rubber ferrule 4 but also between the outer surface of the rubber ferrule and the inside surface 5 of the tubing. Not only does internal fluid pressure create a tight joint but actually in pulling or stretching the tubing 7 axially an extremely tight joint is effected between the telescoped members. The construction produces a relatively simple and inexpensive joint and at the same time is very effective in producing a fluid tight connection between the tubing and the outer ferrule. At the same time the joint therebetween is protected from any injury from the outside, prevents tampering or any accidental interference therewith.

Referring now to the modified form and as explained in connection with the previous figure in Fig. 2, the outer tubing 3 need not necessarily be threaded as shown at 2 in Fig. 1 but it may be made with a soldered or brazed connection, or welded at 12, the outer ferrule 13 preferably being made in rubber also and snugly engages the interior 5 of the tubing in the same manner as described in connection with Fig. 1. In this case similarly the member 13 is provided with an inner tapered surface at 14 between which the tubing 7 is interposed, its end being folded outwardly over the inner brass ferrule 15. The latter member is provided with the outer tapered surface 16 matching the tapered surface 14 of the outer member 13. The inner ferrule 15 is rounded as at 10 to allow for the stretching of the rubber tubing between the surfaces 14 and 16. Thus it will be noted that the end 11 of the tubing as distinguished from the construction shown in Fig. 1 is folded outwardly between the surfaces 14 and 16 instead of being folded inwardly as shown in Fig. 1.

It should of course be clear that the members 4 and 13 need not necessarily be of rubber but may be of any other material capable of being suitably stretched or expanded so as not only to form a tight joint between the tubing and the ferrule but also to enable the ends of the rubber tubing clamped between the tapered surfaces being held securely. While throughout the description reference has been made in the inner ferrule members 8 and 15 as being of brass or other non-corrodible material, it should of course be apparent that they may be of a non-metallic material such as a composition synthetic, natural or otherwise to serve the same purpose as the metallic non-corrodible material.

While this invention has been shown in but two forms it should be obvious to those skilled in the art that it is not so limited but is susceptible of various changes and modifications without departing from the spirit thereof or the scope of the appended claims.

I claim:

1. The combination in a pipe joint, a flexible tubular member, a substantially cylindrical member, said flexible member being enclosed within the latter named cylindrical member, an outer ferrule member and an inner ferrule member, the outer ferrule member being expandible to fit snugly within the cylindrical member, said ferrule members having opposed tapering annular surfaces in substantially the same plane, the periphery of the said annularly outer ferrule member being substantially of the same diameter as the internal diameter of the outer cylindrical member, an end portion of the flexible tubular member being folded over the inner ferrule member, the said folded portion extending in a direction toward the smaller end of the tapered annular surfaces the said latter member normally being nested within the expandible outer ferrule member whereby upon moving the inner ferrule member axially relative to the outer ferrule member a portion of the flexible tubing adjacent the folded portion is gripped between the tapered surfaces of the respective inner and outer ferrule members.

2. In a pipe joint, a combination comprising a flexible tubular member, a substantially cylindrical member, said flexible member being telescopically positioned with relation to the latter named cylindrical member, an outer expandible ferrule member and an inner ferrule member, said ferrule members having opposed tapering annular surfaces in substantially the same inclined plane, the periphery of the said outer expandible ferrule member being substantially of the same diameter as the internal diameter of the outer cylindrical member, the inner ferrule normally being nested within the outer expandible ferrule member with an end portion of the flexible tubular member folded over an inner end portion of the inner ferrule member between the assembled ferrules and extending in a direction toward the smaller end of the tapering annular surfaces whereby the flexible tubular member may be gripped between the tapered surfaces of the respective assembled inner and outer ferrule members, so that upon moving said flexible member axially in a direction away from the said assembled ferrule members the tightness of the grip of the flexible member between said tapered surfaces is increased.

3. In a pipe joint, a combination comprising a flexible tubular member, a substantially cylindrical member, said flexible member being telescopically positioned with relation to the latter named cylindrical member, an outer expandible ferrule member and an inner ferrule member, the said ferrule members having opposed tapering annular surfaces extending in substantially the same inclined plane to receive an end folded portion of the flexible tubular member therebetween to substantially enclose the said inner ferrule member, the end folded portion of the flexible tubular member extending in a direction toward the smaller end of the opposed tapering annular surfaces, the periphery of the said outer ferrule member being substantially of the same diameter as the internal diameter of the outer cylindrical member, the inner ferrule being substantially rigid and being received within an inner annular tapered surface portion of the outer ferrule member whereby upon predetermined endwise movement of the flexible tubular member the inner ferrule member is moved axially relative to the outer ferrule member inwardly upon said annular tapered surface portion and thereby permit radial expansion of the said outer ferrule member against an interior annular surface of the said cylindrical member to form a fluid tight seal between the said ferrule members and the flexible tubular member and between the outer ferrule member and the cylindrical member.

4. In a pipe joint, the combination including a flexible tubular member folded back at its end portion, an outer tubular member substantially surrounding the inner flexible tubular member, inner and outer ferrules within said latter tubular member in nested relation to each other, the outer ferrule being expandible to contact an inner annular surface of the outer tubular member, the said inner and outer ferrule members having complementary annular tapered surfaces to receive therebetween a folded end portion of the said flexible tubular member and permitting relative axial movement between the inner and outer ferrules to expand said outer ferrule while increasing the tightness of the seal between the flexible tubing and the ferrules, the inner ferrule having a rounded end portion thickened to form the folded end of the flexible tubular member, the folded end portion of the flexible tubing enclosing both inner and outer annular surfaces of the said inner ferrule and the rounded thickened annular end portion of the latter member and extending in a direction toward the smaller end of the annular tapered surfaces.

GEORGE HANSEN.

REFERENCES CITED

The following references are of record in the file of this patent:

UNITED STATES PATENTS

| Number | Name | Date |
|---|---|---|
| 2,031,849 | O'Leary | Feb. 25, 1936 |
| 2,150,471 | Van Vulpen | Mar. 14, 1939 |